United States Patent [19]
Bhatt et al.

[11] Patent Number: 5,517,213
[45] Date of Patent: May 14, 1996

[54] PROCESS FOR FAST BLIND EQUALIZATION OF AN ADAPTIVE EQUALIZER

[75] Inventors: Bhavesh B. Bhatt, Franklin Park, N.J.; Adolf Dsouza, Indianapolis, Ind.

[73] Assignee: Thomson Consumer Electronics, Inc., Indianapolis, Ind.

[21] Appl. No.: 315,050

[22] Filed: Sep. 29, 1994

[51] Int. Cl.$^6$ .................................................. H03H 7/30
[52] U.S. Cl. ...................... 375/232; 375/229; 364/724.2
[58] Field of Search .................................... 375/232, 235, 375/229; 333/28; 364/724.1, 724.19, 724.2

[56] References Cited

U.S. PATENT DOCUMENTS

| | | | |
|---|---|---|---|
| 5,134,464 | 7/1992 | Basile et al. | 358/12 |
| 5,157,690 | 10/1992 | Buttle | 375/232 |
| 5,263,033 | 11/1993 | Seshadri | 375/238 |
| 5,267,266 | 11/1993 | Chen | 375/350 |
| 5,282,225 | 1/1994 | Nikias et al. | 375/232 |
| 5,297,166 | 3/1994 | Batruni | 364/724.2 |
| 5,311,546 | 5/1994 | Paik et al. | 375/344 |

OTHER PUBLICATIONS

Simulation and Implementation of US QAM-Based HDTV Channel Decoder, Liu et al., IEEE Transactions on Consumer Electronics, Aug. 1993.

Adaptive Blind Equalization Coupled with Carrier Recovery for HDTV Modem, Choi et al., IEEE Transactions on Consumer Electronics, Aug. 1993.

Joint Blind Equalization, Carrier Recovery, and Timing Recovery For High-Order QAM Signal Constellations, by Jablon. IEEE Transactions on Signal Processing, Jun. 1992.

Digital Communication, by Lee and Messerschmitt (Kluwer Academic Press, 1988).

Picchi et al "Blind Equalization and Corner Recovery Using a Stop and Go Decision Directed Algorithm" IEEE pp. 877–887 Sep. 1987.

*Primary Examiner*—Stephn Chin
*Assistant Examiner*—T. Ghebretinsae
*Attorney, Agent, or Firm*—Joseph S. Tripoli; Eric P. Herrmann; Ronald H. Kurdyla

[57] ABSTRACT

A blind equalization process (200) for an adaptive equalizer including a plurality of taps, each having a corresponding coefficient, is disclosed which comprises the following steps. Blind equalization (204) is performed on a subset of the coefficients in the adaptive equalizer. Then, if the coefficients have converged (206), a decision directed adaptive equalization process (220) is initiated.

21 Claims, 2 Drawing Sheets

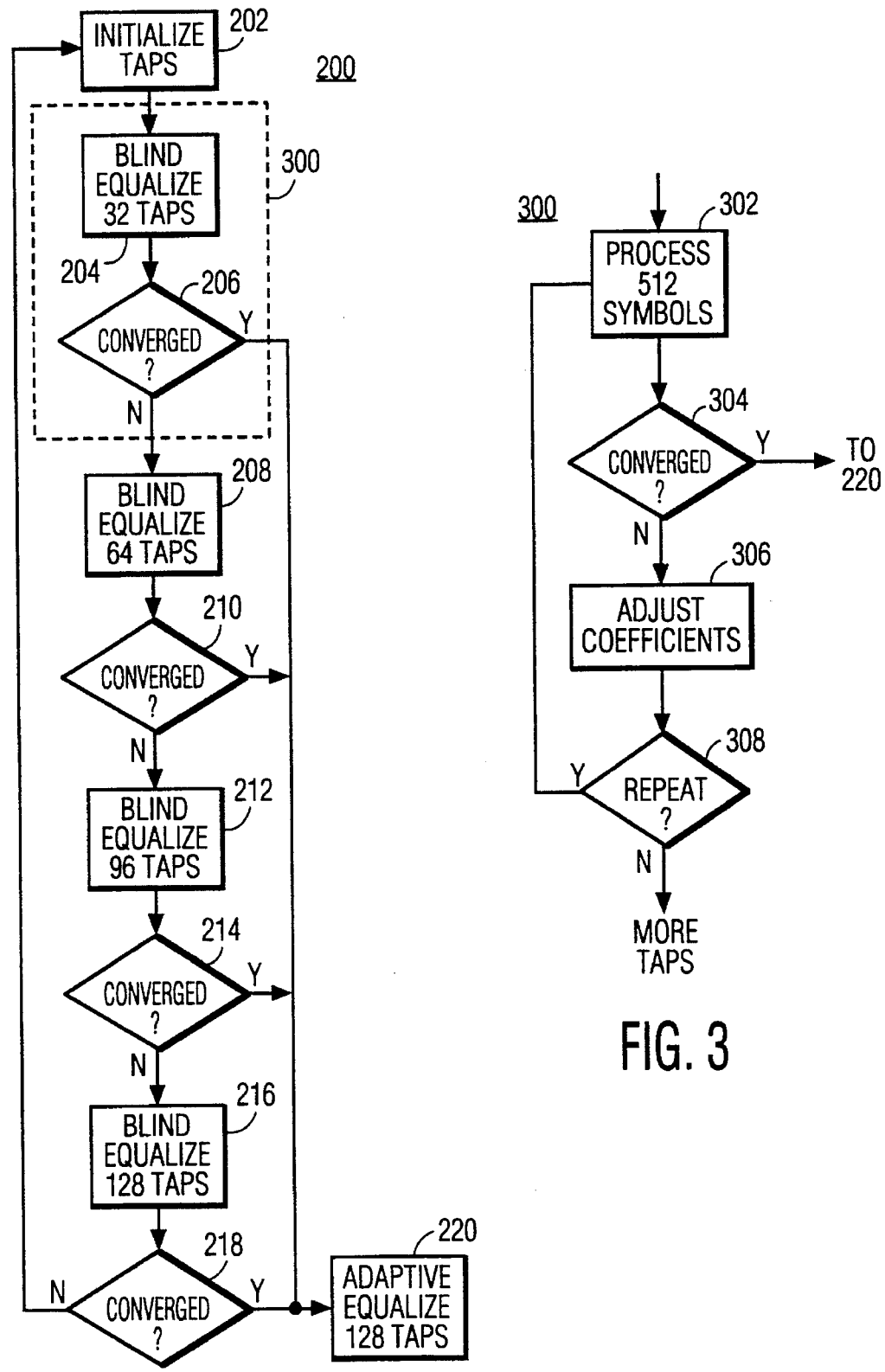

1

PROCESS FOR FAST BLIND EQUALIZATION OF AN ADAPTIVE EQUALIZER

FIELD OF THE INVENTION

The present invention relates to a process for fast blind equalization of an adaptive equalizer such as may be used in an advanced digital television receiver, e.g., as a high definition television receiver.

BACKGROUND OF THE INVENTION

In a high bandwidth digital transmission system, such as in an advanced digital television (ADTV) system, it is important that artifacts introduced into the received signal by the transmission channel, such as multipath effects and intersymbol interference, be removed, or proper reception will be difficult or impossible. To remove such artifacts, ADTV receivers may include an adaptive equalizer. Such adaptive equalizers are generally embodied as multitap transverse digital filters in an FIR and/or IIR configuration with tap coefficients which are continually varied to minimize the transmission channel artifacts and to maintain the received signal as close as possible to the transmitted signal. In general, the larger the number of taps, the better the equalization quality.

Once the adaptive equalizer is in operation, various decision directed processes are known for maintaining the coefficients as close to their optimum values as practicable. However, these decision directed processes require that the coefficients already be relatively close to their optimum values in order to operate properly. If the values of the coefficients are too far from their optimum values, these decision directed processes fail to converge. Thus, proper operation of an adaptive equalizer requires two steps, an initial adjustment of the coefficients close to their optimum values, then maintenance of the coefficients as close to their optimum values as practicable.

In some high bandwidth systems, such as telephone systems, a training signal is transmitted before data transmission, and the adaptive equalizer can adjust the coefficients close to their optimum values based on the received training signal. The nature of a television system, however, is such that training signals may be impractical. Thus, the adaptive equalizer must generate the initial estimates of the coefficients based on the received data signal alone, a process known as blind equalization. Only when the blind equalization process has been completed can the decision directed adaptive equalization process be invoked to maintain the coefficients at or near their optimum values.

SUMMARY OF THE INVENTION

The inventors have realized that, while a large number of taps in the equalizer provides better quality equalization, blind equalization of the large number of tap coefficients takes a relatively large amount of time. On the other hand, blind equalization of a smaller number of coefficients would take a relatively smaller amount of time, but an equalizer with a smaller number of taps will provide lower quality, and quite possibly unacceptable, equalization.

In accordance with principles of the present invention, a blind equalization process for an adaptive equalizer including a plurality of taps, each having a corresponding coefficient, comprises the following steps. Blind equalization is performed on a subset of the coefficients in the adaptive equalizer. Then, if the coefficients have converged, a decision directed adaptive equalization process is initiated.

BRIEF DESCRIPTION OF THE DRAWING

In the drawing:

FIG. 2 is a flow diagram of the fast blind equalization process according to the present invention;

FIG. 3 is a more detailed flow diagram of a portion of the fast blind equalization process illustrated in FIG. 2.

In FIG. 1, only the blocks necessary for an understanding of the present invention are illustrated. For simplicity, other processing blocks, and other connections carrying signals such as control and timing signals, have been omitted. One skilled in the art of ADTV design will understand what other blocks are necessary, how they are connected to and interoperate with the illustrated blocks, what timing and control signals are required by the respective blocks, and how to generate and disseminate those signals.

In FIG. 1, a source of a quadrature amplitude modulated (QAM) ADTV signal modulated by multilevel digital symbols in the form of a QAM constellation provides a signal to an antenna 5. Such a QAM signal is one type of a Pulse Amplitude Modulated (PAM) signal. The antenna 5 is coupled to the serial connection of a detector 10, an adaptive equalizer 20, a demodulator 30, a slicer 40, a decoder 50 and video and audio signal processing and reproduction circuitry 60. The video and audio signal processing and reproduction circuitry 60 provides the video image and audio sounds to the user via a display screen and speakers (not shown), or signals representing these components to other equipment, such as a video cassette recorder (also not shown). An error detector 70 has respective input terminals coupled to the input and output terminals of the slicer 40, and an output terminal producing an error representative signal (e). The error signal output terminal of the error detector 70 is coupled to an input terminal of a coefficient control network 80. A coefficient output terminal of the coefficient control network 80 is coupled to a coefficient input terminal of the adaptive equalizer 20.

Figure 1:
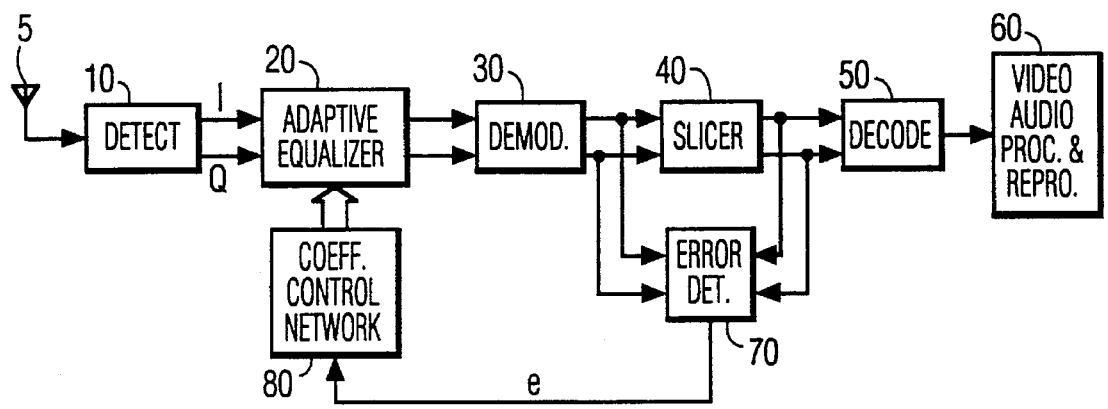
FIG. 1 is a block diagram of a portion of an ADTV receiver including an equalizer operated according to the present invention.

The detector 10 includes an RF tuner, local oscillator and intermediate frequency amplifiers, as well as an analog-to-digital converter, timing synchronization recovery and clock generation circuitry, and a 90⁻ phase shifter (none of which are shown) coupled together in a known manner. In operation, these components cooperate to produce passband in-phase (I) and quadrature (Q) components of the received QAM signal at respective output terminals of the decoder 10. The elements described above, their arrangement and operation are well known and will not be discussed in detail. Although the antenna 5 implies reception of a broadcast RF signal, components similar to those described above (also well known) could be used to also receive RF modulated signals from a cable or fiber optic source and produce the passband I and Q signals.

The adaptive equalizer 20 in the illustrated embodiment includes a 128 tap FIR digital filter which operates in a known manner to minimize the effects of multipath and intersymbol interference on the detected passband I and Q signals. It is also known to use a combination of an FIR and IIR digital filter for the adaptive equalizer. The tap coefficients for the 128 taps of the FIR filter are continually supplied by the coefficient control network 80, in a manner which will be described below.

The demodulator 30, which may also include a derotator with an associated phase controller and a bandpass filter (BPF) (none of which are shown), arranged in a known manner, demodulates the equalized passband I and Q signals to produce baseband I and Q signals. These demodulated baseband I and Q signals represent a location somewhere within the QAM symbol constellation. The slicer 40 receives the demodulated baseband I and Q signals, determines which symbol in the constellation is closest to the location represented by those signals, and produces at its output, in known manner, I and Q signals having values corresponding to the location of that closest symbol. These I and Q signals are supplied to the decoder 50 which produces a multibit digital word corresponding to the symbol. The decoded multibit digital word is supplied to the video and audio signal processing and reproduction circuitry 80. As described above, the video and audio signal processing and reproduction circuitry processes the multibit digital word to provide the image and sound to the viewer.

As is well known, the difference between the location in the symbol constellation represented by the demodulated baseband I and Q signals at the input of the slicer 40, and location of the closest symbol, as represented by the I and Q signals produced at the output of the slicer 40, represents the error in the received symbol. The error detector 70 operates, in a known manner, on the respective I and Q signals at the input and output of slicer 40 to determine this error and supplies a signal e representing this error to a coefficient control network 80.

The coefficient control network 80, which may include a microprocessor (µP) or digital signal processor (DSP) and associated circuitry (not shown), responds to the error signal e and calculates new values for the coefficients of the taps of the adaptive equalizer 20 in an attempt to minimize the error signal e. These coefficients are then supplied to the tap multipliers in the adaptive equalizer 20. During normal operation, the coefficients are iteratively adjusted in a decision directed manner through the use of a known process, such as a least mean square (LMS) algorithm.

As described above, however, before the decision directed LMS algorithm can operate properly, a blind equalization process must be performed to place coefficients in the taps of the adaptive equalizer 20 which are sufficiently close to the optimum coefficients for the decision directed LMS algorithm to converge. FIG. 2 is a flow diagram of a fast blind equalization process 200 according to the present invention. The steps illustrated in FIG. 2 are executed by the ÊP or DSP within the coefficient control network 80 when a new signal is detected by detector 10, such as at power up, or when the viewer changes channels.

In the illustrated embodiment, as described above, the adaptive equalizer 20 (of FIG. 1) includes a 128 tap FIR filter. In step 202 of FIG. 2, the coefficients of all of these taps are preset. All the coefficients are set to 0 except the middle eight taps. The coefficients for the two middle taps are set to real values of about 0.5, those for the next two surrounding taps are set to real values of about 0.25, those for the next two surrounding taps are set to real values of about 0.125, and those for the next two surrounding taps are set to real values of about 0625.

Then in step 204, an attempt is made to blind equalize the middle 32 taps of the adaptive equalizer 20 (of FIG. 1). In step 206, it is determined if the coefficients of the adaptive equalizer 20 have converged. If so, then the output of step 206 labeled "Y" is taken and step 220 is entered. In step 220, the decision directed adaptive equalization process is initiated. If the coefficients of the adaptive equalizer 20 have not converged, then the output of step 206 labeled "N" is taken and step 208 is entered. The combination 300 of steps 204 and 206 will be described in more detail below.

In step 208, an attempt is made to blind equalize the 64 middle taps of the adaptive equalizer 20 (of FIG. 1), and in step 210 it is determined if the coefficients have converged. If the coefficients have converged, the output of step 210 labeled "Y" is taken, and decision directed adaptive equalization of step 220 is initiated. If not, then the output labeled "N" is taken and an attempt to blind equalize the coefficients of the middle 96 taps is made in step 212. Steps 212 and 214 attempt to blind equalize the 96 middle taps of the adaptive equalizer 20, and steps 216 and 218 attempt to blind equalize all of the 128 taps of the adaptive equalizer 20. Step 218 differs from steps 206, 210 and 214 only in that if the coefficients have not converged, then the blind equalization is reinitiated in step 202.

Figure 4:
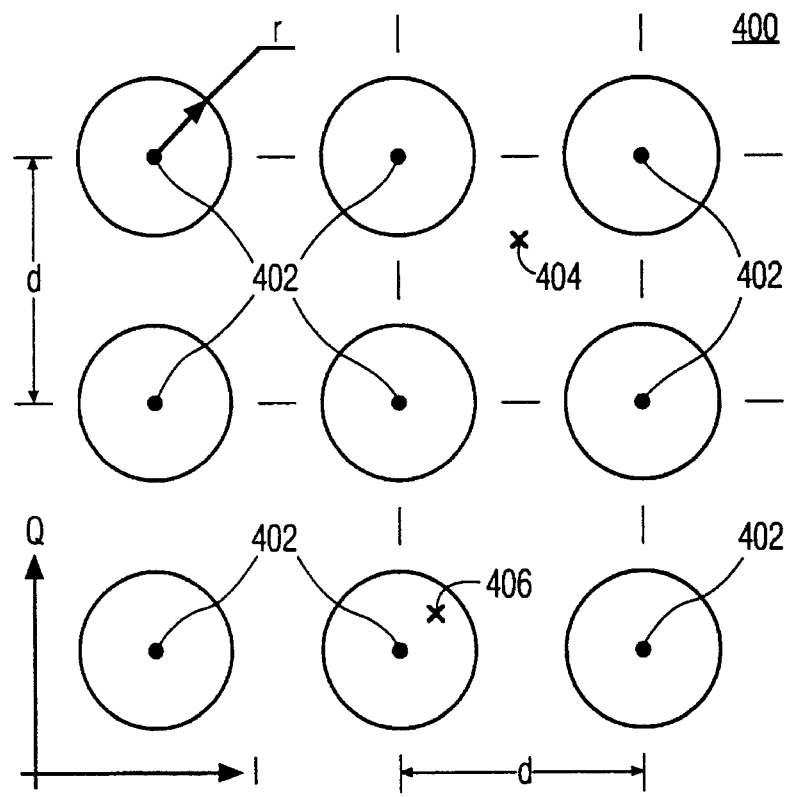
FIG. 4 is a diagram illustrating a portion of the IQ plane useful in understanding the portion of the fast blind equalization process illustrated in FIG. 3.

FIG. 3 is a more detailed flow diagram of a portion 300 of the fast blind equalization process illustrated as blocks 204 and 206 in FIG. 2, and FIG. 4 is a diagram illustrating a portion of the IQ plane 400 useful in understanding the portion of the fast blind equalization process illustrated in FIG. 3. The same operations 300 are performed for the combinations of blocks 208 and 210; blocks 212 and 214; and blocks 216 and 218. In FIG. 3, step 302 is initially entered after the coefficients for the middle eight taps were preset in step 202 of FIG. 2. In step 302, 512 received symbols are processed.

Referring now to FIG. 4, valid symbol locations in the IQ plane 400 are represented by solid dots 402. Only nine valid symbol locations 402 are shown in FIG. 4, but one skilled in the art of multilevel QAM digital transmission systems will understand that there are more than the nine valid symbol locations in the entire IQ plane. The valid symbol locations 402 are disposed in a rectangular manner in the IQ plane, with a spacing d between rows and columns of the valid symbol locations 402. A circle having a radius r is considered to be centered around each valid symbol location 402. The radius r is set to about ⅓ d. As each received symbol is processed in step 302, the location in the IQ plane 400 represented by the I and Q signals corresponding to the received symbol is checked to determine if it lies within a predetermined distance of a valid symbol location 402. In the illustrated embodiment, the location of the received symbol is checked to determine if it lies within the circle centered around a valid symbol location 402.

For example, in FIG. 4, locations corresponding to received symbols are represented by crosses. A location 404, represents one such received location, and lies beyond a distance r from any valid symbol location 402. A location 406 represents another received location, and lies within a distance r from the bottom center illustrated valid symbol location. As each of the 512 received symbols is processed in step 302, a count of how many times the received location falls within a distance r of a valid symbol location is maintained. Each time a received location lies with a distance r of a valid symbol location, the count is incremented. Referring again to FIG. 3, in step 304, after all 512 received symbols have been processed, this count is checked. If it is above a predetermined number, then the coefficients are considered to be converged. In the illustrated embodiment, this predetermined number is about 100. That is, if more than about 100 of the locations of the received symbols lie within a distance r of a valid symbol location, then the output labeled "Y" is taken from step 304, and the decision directed adaptive equalization process of step 220 (of FIG. 2) is initiated.

If the coefficients have not converged, then the coefficients of the adaptive equalizer 20 (of FIG. 1) are adjusted in step 306. The adjustment is made in accordance with a known block least mean square (block-LMS) algorithm. In block 302, information from each received symbol is accumulated to permit adjustment of the coefficients based on the entire block of 512 received symbols. In block 306, this accumulated information is processed and updated values for the coefficients are calculated. These coefficients are then supplied to the adaptive equalizer 20.

After this adjustment is made, a decision is made whether to repeat the above process, or to continue on to attempt to blind equalize a larger subset of the taps in the adaptive equalizer 20. In the illustrated embodiment, a fixed number of coefficient adjustments are made to each subset of taps. For the attempt to blind equalize 32 taps (steps 204 and 206), four adjustments are made to the coefficients. I.e. in step 308, if less than four coefficient adjustments have been made to the 32 center taps, then the processing is repeated and the output of step 308 labeled "Y" is taken, reexecuting step 302. If four adjustments have been made, then the output of step 308 labeled "N" is taken, and step 208 (of FIG. 2) is entered.

Four coefficient adjustments each are made in the attempts to blind equalize the 32 center taps (as just described), the 64 center taps, and the 96 center taps. When steps 216 and 218 are performed, attempting to blind equalize all 128 taps of the adaptive equalizer 20 (of FIG. 1), a longer period of time is allocated. In the illustrated embodiment, 52 coefficient adjustments are made in an attempt to blind equalize the 128 taps of the adaptive equalizer 20. If the coefficients have not converged after 52 attempts, then the blind equalization process 200 is repeated from the beginning. An alternative view is that a maximum period is allocated to achieve convergence using the blind equalization process of FIG. 2 and FIG. 3. In the illustrated embodiment, a maximum number of 64 coefficient adjustments is allocated to achieve convergence. If convergence has not been achieved by that time, the attempt is abandoned, and a new attempt is initiated.

A system using a blind equalization process according to the present invention will provide a speed increase over the prior processes which always attempt to blind equalize all of the taps of the adaptive equalizer. For example, if the coefficients of the adaptive equalizer have converged after step 204 of FIG. 2, a 4:1 speed increase is realized using the process 200 of the present invention.

The illustrated embodiment of the present invention has been described in terms of a QAM multilevel digital transmission system. One skilled in the art will understand that the essence of the invention may be applied to other digital transmission systems including an adaptive equalizer which includes a plurality of taps, each having an associated coefficient, in which blind equalization is required before decision directed equalization is initiated. For example, a similar system could be used in a multilevel VSB ADTV system.

What is claimed is:

1. A blind equalization process for an adaptive equalizer including a plurality of taps, each having a corresponding coefficient, comprising the steps of:

performing blind equalization on a subset of the coefficients in the adaptive equalizer, said subset comprising less than all of said coefficients;

determining if the coefficients of the subset have converged; and if the coefficients of the subset have converged, then initiating a decision directed adaptive equalization process.

2. The process of claim 1, wherein the decision directed adaptive equalization process comprises the step of executing a least means squares algorithm.

3. The process of claim 1, further including the step of initializing a predetermined plurality of the coefficients to predetermined fixed values before the step of performing blind equalization.

4. The process of claim 1, wherein the adaptive equalizer includes 128 taps.

5. A blind equalization process for an adaptive equalizer including a plurality of taps, each having a corresponding coefficient, comprising the steps of:

performing blind equalization on a subset of the coefficients in the adaptive equalizer;

determining if the coefficients have converged; and if the coefficients have converged, then initiating a decision directed adaptive equalization process;

wherein the step of performing blind equalization comprises the steps of:

receiving a signal representing a received symbol;

determining if the received signal is within a predetermined distance of an ideal signal representing a valid symbol;

incrementing a count if the received signal is within the predetermined distance of the ideal signal;

accumulating information from each symbol in response to the received signal; and repeating the receiving, determining, incrementing and accumulating steps a fixed number of times.

6. A blind equalization process for an adaptive equalizer including a plurality of taps, each having a corresponding coefficient, comprising the steps of:

performing blind equalization on a subset of the coefficients in the adaptive equalizer, including the steps of (a) receiving a signal representing a received symbol;

(b) determining if the received signal is within a predetermined distance of an ideal signal representing a valid symbol;

(c) incrementing a count if the received signal is within the predetermined distance of the ideal signal;

(d) accumulating information from each symbol in response to the received signal; and (e) repeating the receiving, determining, incrementing and accumulating steps a fixed number of times;

adjusting the subset of coefficients in response to the accumulated information;

determining if the coefficients have converged; and if the coefficients have converged, then initiating a decision directed adaptive equalization process.

7. The process of claim 6 further including, after the repeating step, the step of repeating the receiving, determining, incrementing, accumulating and repeating step a predetermined number of times.

8. The process of claim 7 wherein the predetermined number of times is 4.

9. The process of claim 6 wherein the adjusting step comprises the step of executing a block least mean square algorithm.

10. A blind equalization process for an adaptive equalizer including a plurality of taps, each having a corresponding coefficient, comprising the steps of:

performing blind equalization on a subset of the coefficients in the adaptive equalizer, including the steps of (a) receiving a signal representing a received symbol;

(b) determining if the received signal is within a predetermined distance of an ideal representing a valid symbol;

(c) incrementing a count if the received signal is within the predetermined distance of the ideal signal;

(d) accumulating information from each symbol in response to the received signal; and (e) repeating the receiving, determining, incrementing and accumulating steps a fixed number of times;

determining if the coefficients have converged; and if the coefficients have converged, then initiating a decision directed adaptive equalization process;

wherein the receiving step comprises the step of receiving a pulse amplitude modulated signal modulated by multilevel digital symbols in the form of a constellation of valid symbols in which rows and columns are spaced apart.

11. A blind equalization process for an adaptive equalizer including a plurality of taps, each having a corresponding coefficient, comprising the steps of:

performing blind equalization on a subset of the coefficients in the adaptive equalizer, including the steps (a) receiving a signal representing a received symbol (b) determining if the received signal is within a predetermined distance of an ideal signal representing a valid symbol;

(c) incrementing a count if the received signal is within the predetermined distance of the ideal signal;

(d) accumulating information from each symbol in response to the received signal; and (e) repeating the receiving, determining, incrementing and accumulating steps a fixed number of times;

determining if the coefficients have converged; and if the coefficients have converged, then initiating a decision directed adaptive equalization process;

wherein the repeating step repeats the receiving, determining, incrementing and accumulating steps 512 times.

12. A blind equalization process for an adaptive equalizer including a plurality of taps, each having a corresponding coefficient, comprising the steps of:

performing blind equalization on a subset of the coefficients in the adaptive equalizer, including the steps of (a) receiving a signal representing a received symbol;

(b) determining if the received signal is within a predetermined distance of an ideal signal representing a valid symbol;

(c) incrementing a count if the received signal is within the predetermined distance of the ideal signal;

(d) accumulating information from each symbol in response to the received signal; and (e) repeating the receiving, determining, incrementing and accumulating steps a fixed number of times;

determining if the coefficients have converged; and if the coefficients have converged, then initiating a decision directed adaptive equalization process;

wherein the step of determining if the coefficients have converged comprises the steps of:

comparing the count to a fixed predetermined threshold value; and if the count is greater than the fixed predetermined threshold value, then determining that the coefficients have converged.

13. The process of claim 12 wherein the fixed predetermined threshold value is substantially 100.

14. A blind equalization process for an adaptive equalizer including a plurality of taps, each having a corresponding coefficient, comprising the steps of:

initializing a predetermined plurality of the coefficients to predetermined fixed values;

performing blind equalization on a subset of the coefficients in the adaptive equalizer;

determining if the coefficients have converged; and if the coefficients have converged, then initiating a decision directed adaptive equalization process;

wherein the adaptive equalizer includes 128 taps symmetrically arranged about a middle point, and the predetermined plurality of coefficients comprises coefficients corresponding to the eight middle taps.

15. The process of claim 14 wherein the predetermined fixed values are real values of substantially:

0.5 for the two middle taps;

0.25 for the next two surrounding taps;

0.125 for the next two surrounding taps; and 0.0625 for the next two surrounding taps.

16. A blind equalization process for an adaptive equalizer including a plurality of taps, each having a corresponding coefficient, comprising the steps of:

performing blind equalization on a subset of the coefficients in the adaptive equalizer;

determining if the coefficients have converged; and if the coefficients have converged, then initiating a decision directed adaptive equalization process; wherein the adaptive equalizer includes taps symmetrically arranged around a center point; and the step of performing blind equalization includes the step of selecting the subset of the coefficients corresponding to taps symmetrically arranged around the center point.

17. The process of claim 16 wherein the step of performing blind equalization includes the step of further selecting the subset of the coefficients corresponding to taps adjacent the center point.

18. The process of claim 16 wherein the adaptive equalizer has 128 taps and the subset of the coefficients correspond to the 32 middle taps.

19. A blind equalization process for an adaptive equalizer including a plurality of taps, each having a corresponding coefficient, comprising the steps of:

performing blind equalization on a subset of the coefficients in the adaptive equalizer;

determining if the coefficients have converged;

if the coefficients have converged, then initiating a decision directed adaptive equalization process; and if the coefficients have not converged, then repeating the step of performing blind equalization using a larger subset of coefficients.

20. The process of claim 19, wherein:

a maximum amount of time is allocated for blind convergence;

the repeating step terminates after the expiration of the maximum amount of time; and the blind equalization process restarts after the expiration of the maximum amount of time.

21. The process of claim 19, wherein:

the adaptive equalizer includes 128 taps;

the step of performing blind equalization includes the step of selecting 32 taps as the subset of coefficients; and the repeating step successively uses subsets of 64, and 128 taps.

* * * * *